R. S. LORD.
CLAMPING DEVICE FOR PIPE JOINTS.
APPLICATION FILED SEPT. 20, 1909.
1,006,490.
Patented Oct. 24, 1911.
2 SHEETS—SHEET 1.
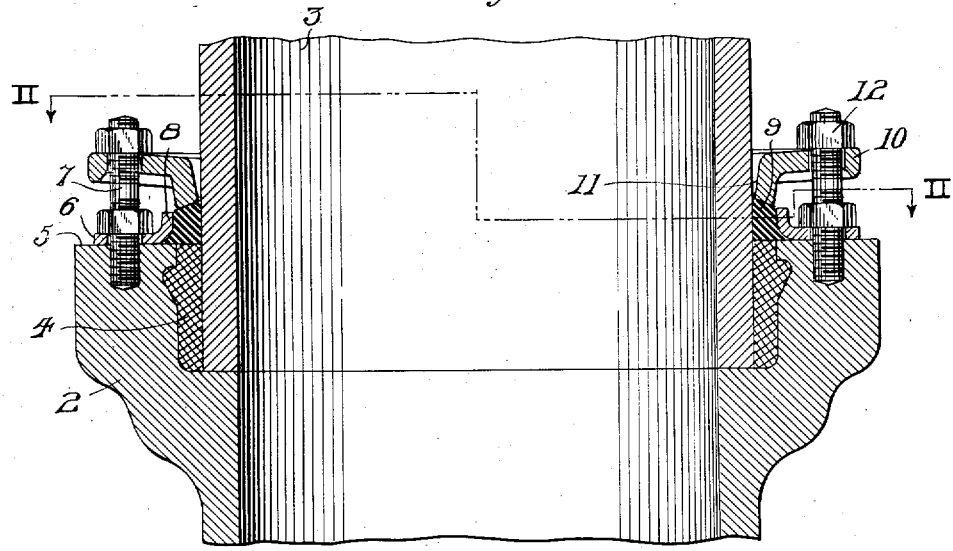
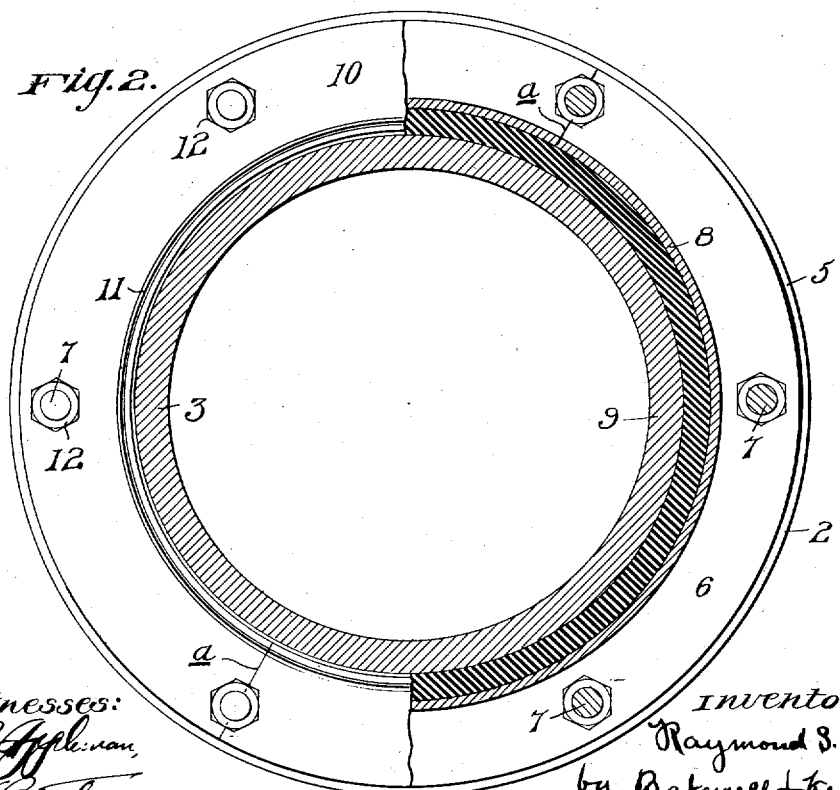
witnesses:
inventor
Raymond S. Lord
by Bakewell + Keller
his Attorneys

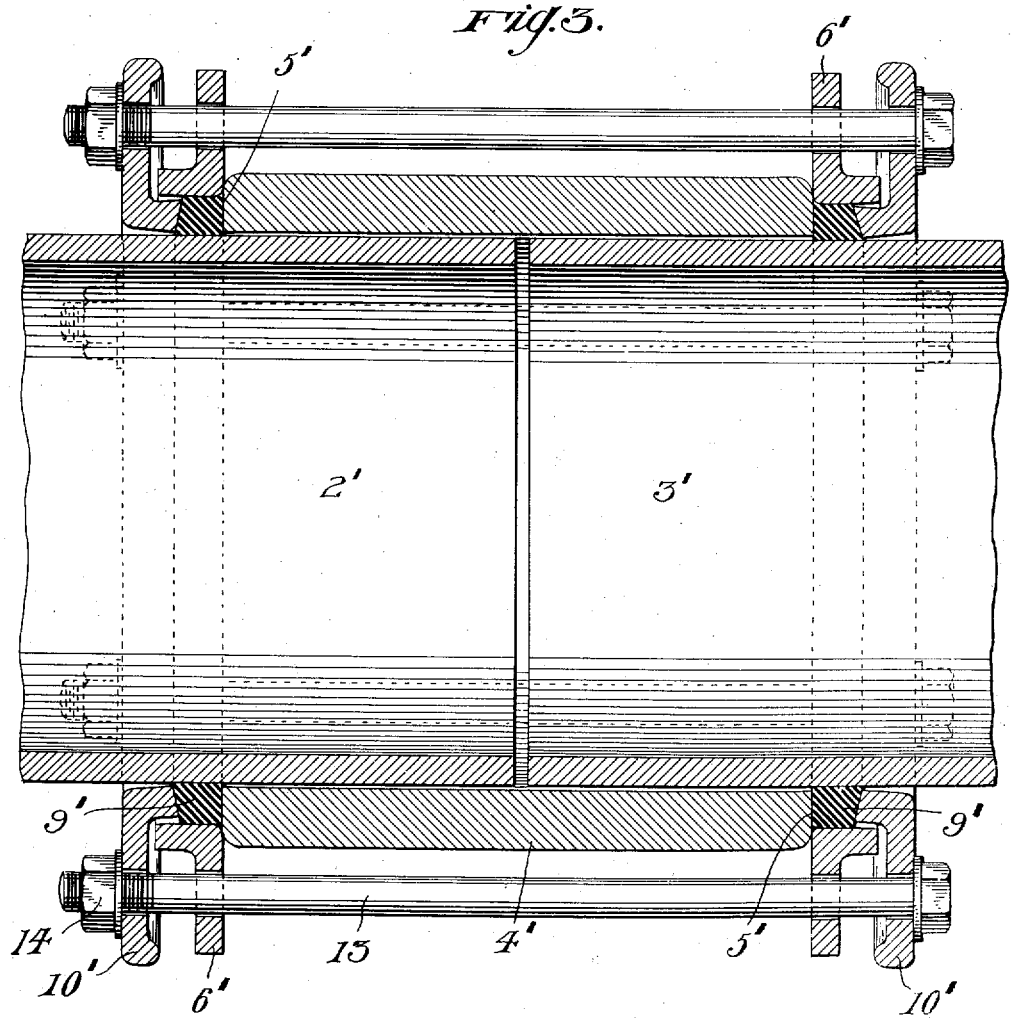

UNITED STATES PATENT OFFICE.

RAYMOND S. LORD, OF PITTSBURGH, PENNSYLVANIA.

CLAMPING DEVICE FOR PIPE-JOINTS.

1,006,490. Specification of Letters Patent. Patented Oct. 24, 1911.

Application filed September 20, 1909. Serial No. 518,641.

*To all whom it may concern:*

Be it known that I, RAYMOND S. LORD, of Pittsburgh, in the county of Allegheny and State of Pennsylvania, have invented certain new and useful Improvements in Clamping Devices for Pipe-Joints, of which the following is a full, clear, and exact description, reference being had to the accompanying drawings, forming part of this specification.

The object of my invention is to provide a simple, inexpensive, and efficient device for sealing or packing pipe joints against leakage.

The invention will be found particularly adaptable to the sealing of the ordinary lead packed socket joint of the cast pipe type.

I will now describe, in connection with the accompanying drawings, my invention so that others skilled in the art to which it appertains may understand and construct the same.

Figure 1 is a longitudinal sectional view showing my invention as applied to the sealing of the joint of the meeting ends of two pipe sections of the cast type; Fig. 2 is a transverse sectional view taken on the line II—II of Fig. 1; and Fig. 3 is a longitudinal sectional view showing my invention as applied to a joint employing a coupling ring or sleeve.

In the drawings, the reference numeral 2 indicates the socketed or bell end of a pipe section of the ordinary cast type, which is adapted to receive the spigot end of the connecting pipe section 3; the joint being packed in the usual manner by means of lead or other packing material interposed between the opposing walls of the two pipe members as indicated by the numeral 4. In abutment with the end face 5 of the socketed pipe member 2 is the concentrically disposed ring member 6 which may be secured to the member 2 by means of the nuts carried by the stud bolts 7. This ring member is provided with an inner annular wall or face 8 between which and the outer wall of the pipe member 3 is adapted to be received the packing ring or gasket 9 which may be of any suitable material and which may partially abut against the end face 5 contiguous to the joint to be sealed, as shown in Fig. 1. At this point where the packing ring 9 abuts against the end face 5, the inner face of the ring member 6 slightly curves away from the face 5. Between this curved portion of the ring and face 5 the packing ring 9 may be clamped by the ring 6 through the action of the tightening nuts 6', thereby sealing the joint at this contiguous point of ring 6 and face 5. Also carried by the studs 7 is the follower or clamping ring 10 which is provided with the annular projecting flange 11 which is adapted to abut against the packing ring 9 and by means of which, when the follower is caused to be moved toward the face 5 or forced home by means of the tightening nuts 12, the packing ring will be caused to be compressed. By means of the packing retaining ring 6 spreading of the packing ring laterally or on radial lines is prevented, insuring an effectual sealing of the joint when packing is caused to be compressed by the drawing home of the follower ring 10 in the manner above described. The ring member 6 and the follower 10 may be segmentally divided as indicated by the letter *a* for convenience in application to the pipe.

As will be seen in Fig. 3, my improved form of clamping device is readily applicable to the packing of a joint employing a coupling ring or sleeve. In this Fig. 3 the numerals 2' and 3' indicate the meeting ends of the pipe sections, while the numeral 4' indicates the surrounding coupling sleeve or ring. This coupling ring 4' is provided with the end faces 5' corresponding with the end face 5 of the socketed pipe member described above. The ring members 6', gaskets 9', and clamping rings 10' correspond, respectively, with the ring 6, gasket 9, and clamping ring 10 above described.

Means for drawing together or forcing home the follower rings 10' for a seating of the gaskets 9' comprise the bolts 13 which extend from one follower ring to the other across the coupling ring 4' and are provided with the tightening nuts 14. The ring members 6' may be held against displacement or creeping by having the follower rings 10' brought in abutment therewith when the latter rings are forced home or drawn toward each other.

The device is simple in construction, being such that the gasket retaining ring member and the follower may be readily cast, formed from sheet metal, or made from rolled shapes. A packing ring of any suitable material may be employed.

I do not here claim the construction set forth in Fig. 3 of the drawings as the same is claimed in a separate application filed by me, Serial No. 588,458, and which is a division of the subject matter of this application.

It will, of course, be apparent that many changes may be made in the construction set forth which would not be a departure from my invention and I do not, therefore, desire to limit myself thereto.

The advantages of my invention will be readily appreciated by those skilled in the art.

The device is simple, strong, and inexpensive and is effectual in operation.

Having thus described my invention, what I claim and desire to secure by Letters Patent is—

1. In a device of the character described, the combination of two coöperating pipe ends comprising bell and spigot members of a main packing between the walls of the members, a ring member contiguous to the end face of the bell end and provided with an annular face disposed oppositely to the outer wall of the spigot member, a packing ring interposed between the oppositely disposed wall of the ring member and pipe section, and means for forcing the packing ring home between the two opposing walls.

2. In a device of the character described, the combination of two coöperating pipe ends comprising bell and spigot members of a main packing between the walls of the members, a ring member secured to the bell end pipe member and provided with an annular face disposed oppositely to the outer wall of the spigot pipe member, a packing ring interposed between the oppositely disposed wall of the ring member and pipe section, and means for forcing the packing ring home between the two opposing walls.

3. In a device of the character described, the combination of two coöperating pipe ends comprising bell and spigot members of a main packing between the walls of the members, a ring member in abutment with the end face of the first named pipe member and provided with an outwardly projecting annular flange surrounding the latter pipe member, a packing ring interposed between the annular flange of the ring member and the wall of the pipe member, and means for forcing the packing ring home between the opposing flange and pipe wall.

4. In a device of the character described, the combination of two coöperating pipe ends comprising bell and spigot members, a ring member surrounding the spigot pipe member and comprising a radial flange portion by means of which it is adapted to be carried by the bell pipe member and an outwardly projecting annular flange disposed at an angle to the radial flange and surrounding the spigot pipe member, a packing ring interposed between the latter flange of the ring member and the opposing wall of the pipe, and means for forcing the packing home between the annular flange and pipe wall.

5. In a device of the character described, the combination of two coöperating pipe ends comprising bell and spigot members, a ring member in abutment with the end face of the bell member and provided with an outwardly projecting annular flange surrounding the other pipe member, a packing ring interposed between the annular flange and the wall of the latter pipe member, a second ring member provided with an annular flange adapted to be brought into abutment with the packing ring, and means for forcing the second ring member toward the first ring member.

6. In a device of the character described, the combination of two coöperating pipe ends comprising bell and spigot members, a ring member secured to the bell pipe member and provided with an outwardly projecting annular flange surrounding the other pipe member, a packing ring interposed between the annular flange and the wall of the latter pipe member, a second ring member provided with an annular flange adapted to be brought into abutment with the packing ring, and means for forcing the second ring member toward the first ring member.

7. In a device of the character described, the combination of two coöperating pipe ends comprising bell and spigot members, a segmentally divided ring member provided with an annular face surrounding the spigot pipe member, a packing ring interposed between the annular face and the wall of the latter pipe member, a second segmentally divided ring member provided with an annular flange adapted to be brought into abutment with the packing ring, and means for forcing the second ring member toward the first ring member.

8. In a device of the character described, the combination of two coöperating pipe ends comprising bell and spigot members, a ring member contiguous to the end face of the bell and provided with an annular face disposed oppositely to the outer wall of the spigot member, a packing ring interposed between the oppositely disposed wall of the ring member and pipe section and having portions lying between the ring member and end face of the bell end, and means for forcing the packing ring home between the opposing walls.

9. In a device of the character described, the combination of two coöperating pipe ends comprising bell and spigot members, a ring member contiguous to the end face of the bell end and provided with an annular face disposed oppositely to the outer wall of the spigot member, a packing ring interposed between the oppositely disposed wall of the ring member and pipe section and having portions lying between the ring member and end face of the bell end, means for clamping the packing ring between the ring member and end face of the bell end, and means for forcing the packing ring home between the opposing walls.

In testimony whereof, I have hereunto set my hand.

RAYMOND S. LORD.

Witnesses:
M. A. BARTH,
M. ARTHUR KELLER.

---

It is hereby certified that in Letters Patent No. 1,006,490, granted October 24, 1911, upon the application of Raymond S. Lord, of Pittsburgh, Pennsylvania, for an improvement in "Clamping-Devices for Pipe-Joints," an error appears in the printed specification requiring correction as follows: Page 1, line 59, for the reference-numeral "6'" read *adjacent the ring 6;* and that the proper corrections have been made in the files and records of the office and are hereby made in the said Letters Patent.

Signed and sealed this 12th day of December, A. D., 1911.

[SEAL.]

E. B. MOORE,
*Commissioner of Patents.* face disposed oppositely to the outer wall of the spigot member, a packing ring interposed between the oppositely disposed wall of the ring member and pipe section and having portions lying between the ring member and end face of the bell end, means for clamping the packing ring between the ring member and end face of the bell end, and means for forcing the packing ring home between the opposing walls.

In testimony whereof, I have hereunto set my hand.

RAYMOND S. LORD.

Witnesses:
M. A. BARTH,
M. ARTHUR KELLER.

---

Correction in Letters Patent No. 1,006,490.

It is hereby certified that in Letters Patent No. 1,006,490, granted October 24, 1911, upon the application of Raymond S. Lord, of Pittsburgh, Pennsylvania, for an improvement in "Clamping-Devices for Pipe-Joints," an error appears in the printed specification requiring correction as follows: Page 1, line 59, for the reference-numeral "6'" read *adjacent the ring 6;* and that the proper corrections have been made in the files and records of the office and are hereby made in the said Letters Patent.

Signed and sealed this 12th day of December, A. D., 1911.

[SEAL.]

E. B. MOORE,
*Commissioner of Patents.*

Correction in Letters Patent No. 1,006,490.

It is hereby certified that in Letters Patent No. 1,006,490, granted October 24, 1911, upon the application of Raymond S. Lord, of Pittsburgh, Pennsylvania, for an improvement in "Clamping-Devices for Pipe-Joints," an error appears in the printed specification requiring correction as follows: Page 1, line 59, for the reference-numeral "6'" read *adjacent the ring 6;* and that the proper corrections have been made in the files and records of the office and are hereby made in the said Letters Patent.

Signed and sealed this 12th day of December, A. D., 1911.

[SEAL.]

E. B. MOORE,
*Commissioner of Patents.*